Patented Oct. 3, 1922.

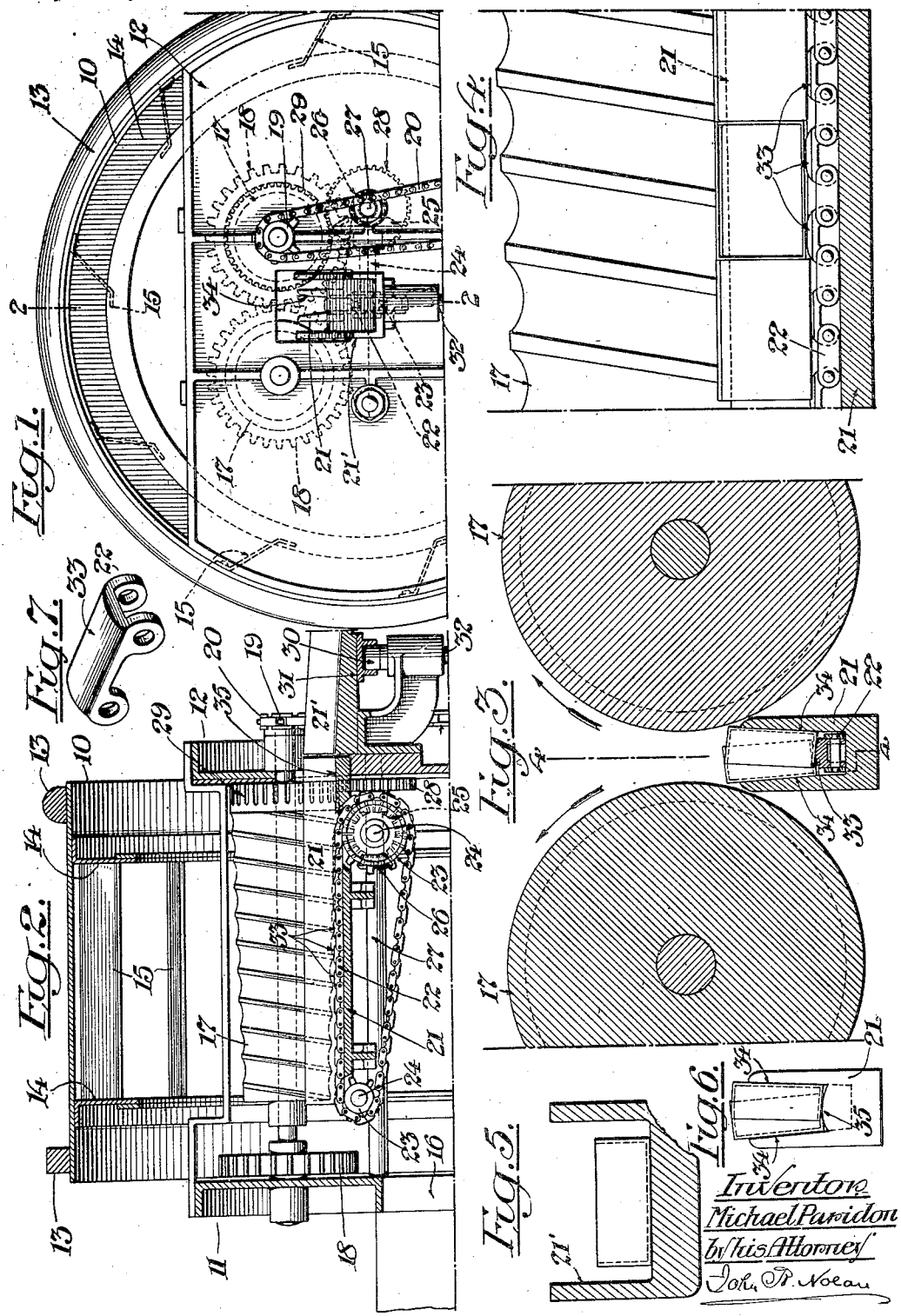

1,430,842

UNITED STATES PATENT OFFICE.

MICHAEL PARIDON, OF BARBERTON, OHIO, ASSIGNOR TO THE DIAMOND MATCH COMPANY, OF CHICAGO, ILLINOIS, A CORPORATION OF ILLINOIS.

MEANS FOR ALIGNING AND FEEDING BOX MEMBERS.

Application filed November 5, 1921. Serial No. 513,148.

*To all whom it may concern:*

Be it known that I, MICHAEL PARIDON, a citizen of the United States, and resident of Barberton, in the county of Summit and State of Ohio, have invented certain new and useful Improvements in Means for Aligning and Feeding Box Members, of which the following is a specification.

This invention relates to means for aligning and feeding box members, such, for example, as the trays or shucks of match boxes; having reference more especially to apparatus for separating box members from a mass of the same and properly positioning them for delivery in endwise succession to a box filling or other machine.

The invention may be described as a modification of and improvement on the box-tray supply mechanism disclosed in Letters Patent of the United States No. 1,086,210, dated February 3, 1914, which patented mechanism includes a rotary hopper for the reception of empty box-trays in mass, said hopper having internal vanes by means of which trays are carried upward from the mass and then dropped within the upper portion of the hopper; a pair of helically-formed spaced-apart rolls mounted to rotate within the hopper and arranged to receive the empty trays thus dropping from the vanes; a trough or guide structure located below and intermediate of the rolls to receive the trays that enter in endwise position into the space between the rolls, while others not so positioned are returned by the rolls to the mass; a traveling conveyer arranged to travel in and longitudinally of the bottom of the trough or guide structure and operative to remove therefrom the edgewise positioned trays, and an inclined U-shaped trough extension into which the thus positioned trays are discharged in endwise succession and thereby caused to gravitate bottoms down; all as fully set forth in said Letters Patent.

The object of the present invention is so to construct the trough or guide structure and the conveyer therein that box members, whether trays or shucks, are tilted laterally within the structure and severally discharged in that condition into the outer or transfer element, on which latter they gravitate laterally to proper position for delivery to the box filling or other machine, as will be hereinafter described and claimed.

In the drawings—

Figure 1 is a partial end elevation of the rotary feed-hopper and adjuncts.

Fig. 2 is a vertical section of the same, as on the line 2—2 of Fig. 1.

Fig. 3 is a transverse section, enlarged, of the helically-formed rolls, the intermediate tray-receiving and discharging trough, and the conveyer; box trays being indicated within the trough and between the rolls.

Fig. 4 is a longitudinal vertical section through the trough, as on the line 4—4 of Fig. 3.

Fig. 5 is a cross-section of the inclined transfer trough into which the box members are delivered from the trough within the hopper.

Fig. 6 is a view of the delivery end of the hopper trough.

Fig. 7 is a perspective view of one of the arched or rounded links of the conveyer.

Referring to the drawings, 10 designates a rotary hopper comprising a drum mounted to turn between housings 11, 12. This drum is rotated in any suitable manner. It may be provided with circumferential rails 13 which rest upon and are driven by appropriate wheels or pulleys located at the base of the housings, as described in Patent No. 1,086,210 aforesaid. Within the drum are suitably-disposed guard rings 14 between which are supported spaced-apart vanes 15. Box members, such as trays or shucks, are introduced in mass into the lower portion of the drum through an opening 16 in the housing 11, and as the drum rotates the vanes pick up the box members in their path and carry them upward to a position above the axis of rotation of the drum, whereupon they drop from the vanes.

17 designates a pair of spaced-apart tapering helical rolls which are journaled in bearings in the end housings and are rotated in any suitable manner upwardly and inwardly toward each other, as indicated by the arrows in Fig. 3. As herein illustrated the shafts of the rolls are provided adjacent the housing 11 with meshing gear wheels 18, and one of the shafts adjacent the other housing is provided with a sprocket wheel 19 to which motion is transmitted from the basal driving mechanism through a sprocket chain 20. The rolls are so positioned that the box members which are carried up by the vanes of the rotating drum are dropped upon the rolls. Owing to their opposite rotation and helical formation the rolls function to carry backward all surplus box members deposited thereon, including those that become interlocked with one another, yet permit a sufficient number of the box members to drop edgewise between the rolls and into a horizontal trough 21, or equivalent guide structure, which is arranged between and longitudinally of the rolls.

Extending along the bottom of the trough is the upper run of an endless chain conveyer 22 which is mounted on sprocket wheels 23 carried by shafts 24 at or adjacent the respective ends of the trough. On the shaft adjacent the delivery end of the trough is a bevel wheel 25 with which meshes a similar wheel 26 on an adjacent shaft 27, the latter shaft bearing a gear wheel 28 in mesh with a gear wheel 29 conveniently formed on the adjacent end of one of the rolls. Thus appropriate motion is transmitted from the roll to the conveyer.

At the delivery end of the trough 21 is an inclined trough 21' which leads to a box filling machine or other instrumentality or point of discharge. The trough 21' is longitudinally vibrated by means such as an eccentric 30 rotating in a socket piece 31 on the bottom of the trough, said eccentric being fast on the upper end of a rotating vertical shaft 32.

When a tray is properly positioned in the trough 21 so as to present its long narrow side to the conveyer, such tray is free of the rolls 17 and is thereby carried endwise to the discharging end of the trough and delivered thence into the transfer trough; but if such tray should be standing on end within the trough 21 the tray when it progresses between the forward larger portions of the rolls will be gripped thereby and lifted out of the trough, thence being returned to the mass within the hopper.

The above described mechanism, excepting as hereinafter explained, is or may be identical with that set out in Patent No. 1,086,210 aforesaid.

According to my invention the surface of the conveyer which is presented to the box members deposited within the trough 21 is so shaped as to permit the lateral tilting of such members. Where the conveyer comprises an endless chain of links as herein illustrated, the alternate links are arched or rounded on their outer faces, as at 33. The inner walls of the trough, above the conveyer, are spaced apart a distance somewhat greater than the depth of a box tray or shuck; such walls in the present instance being slightly flared or inclined outward, as at 34. Consequently when a box member is positioned upon the arched or convex face of the chain links such member is tilted by gravity to one side or the other of the trough, and is supported in that position during its progress to the discharging end of the trough. When the box member resting upon the chain is a tray the bottom gravitates to the adjacent side of the trough, as indicated in Fig. 3; but when the box member resting upon the chain is a shuck or cover such member in its progress is tilted toward and against either side of the trough. In any case the box member is in an inclined position when it reaches the delivery end of the trough. The floor of the trough at this end is arched, as at 35, so that the box members will maintain their inclined position and thus be discharged into the vibrating transfer trough 21'. In the present instance the floor of the latter trough, instead of being concave as in the patented construction, is flat, as seen in Fig. 5. Immediately after the inclined box member is delivered into the vibrating trough such member assumes by gravity a flat position upon the latter and is thus fed downward to the filling or other machine. If the member be a tray it will gravitate bottom down upon the floor of the trough, but if the member be a shuck or cover it will drop flatwise upon the trough. Hence if the box members be trays they will be fed successively end to end, bottoms down, along the transfer trough, and if such members be shucks they will be fed successively end to end, with one wide side or the other on the bottom of the transfer trough.

It is to be understood that my invention is not limited to the specific construction disclosed, as the same may be modified within the principle of my invention and the scope of the appended claims.

I claim—

1. In mechanism for aligning and feeding box members, a trough, a conveyer extending along the interior of the trough, and means for positioning box members within the said trough to present one long narrow side of each member to the conveyer, the inner walls of the trough being spaced apart above the conveyer a distance greater than the depth of a box member, and the receiving surface of the conveyer being shaped to permit the box member to tilt to one side or the other of the trough.

2. In mechanism for aligning and feeding box members, a trough, a conveyer extending along the interior of the trough, and means for positioning box members within the said trough to present one long narrow side of each member to the conveyer, the inner walls of the trough being spaced apart above the conveyer a distance greater than the depth of a box member, and the receiving surface of the conveyer being arched or rounded transversely to permit the box member to tilt to one side or the other of the trough.

3. In mechanism for aligning and feeding box members, a trough, a chain conveyer extending along the interior of the trough, and means for positioning box members within the trough to present one long narrow side of each member to the chain, the inner walls of said trough being spaced apart above the conveyer a distance greater than the depth of a box member, and the supporting surface of the chain links being arched or rounded transversely to permit the box member to tilt to one side or the other of the trough.

4. In mechanism for aligning and feeding box members, a trough, a conveyer extending along the interior of the trough, and means for positioning box members within the said trough to present one long narrow side of each member to the conveyer, the inner walls of the trough being spaced apart above the conveyer a distance greater than the depth of a box member, and the receiving surface of the conveyer being shaped to permit the box member to tilt to one side or the other of the trough, together with an element upon which the laterally inclined box members are discharged and permitted to gravitate to a flat position.

5. In mechanism for aligning and feeding box members, a trough, a conveyer extending along the interior of the trough, and means for positioning box members within the said trough to present one long narrow side of each member to the conveyer the inner walls of the trough being spaced apart above the conveyer a distance greater than the depth of a box member, and the bearing surface of the conveyer being arched or rounded transversely to permit the box member to tilt to one side or the other of the trough, together with an element upon which the laterally inclined box members are discharged from the trough and permitted to gravitate to a flat position.

6. In mechanism for aligning and feeding box members, a trough, a chain conveyer extending along the interior of the trough, and means for positioning box members within the trough to present one long narrow side of each member to the chain, the inner walls of said trough being spaced apart above the conveyer a distance greater than the depth of a box member, and the supporting surface of the chain links being arched or rounded transversely to permit the box member to tilt to one side or the other of the trough, together with an element upon which the laterally inclined box members are discharged from the trough and permitted to gravitate to a flat position.

Signed at Barberton, in the county of Summit and State of Ohio, this 2nd day of November, A. D. 1921.

MICHAEL PARIDON.